United States Patent
Skelding

(10) Patent No.: US 10,267,663 B2
(45) Date of Patent: Apr. 23, 2019

(54) MASS FLOW MEASUREMENT APPARATUS AND METHOD

(71) Applicant: Able Instruments & Controls Ltd, Reading (GB)

(72) Inventor: Anthony P Skelding, Swindon (GB)

(73) Assignee: ABLE INSTRUMENTS & CONTROLS LTD, Reading (GB)

( * ) Notice: Subject to any disclaimer, the term of this patent is extended or adjusted under 35 U.S.C. 154(b) by 442 days.

(21) Appl. No.: 14/950,145

(22) Filed: Nov. 24, 2015

(65) Prior Publication Data

US 2016/0146653 A1     May 26, 2016

(30) Foreign Application Priority Data

Nov. 26, 2014  (GB) .................................. 1420996.9
Nov. 9, 2015   (GB) .................................. 1519700.7

(51) Int. Cl.
| | | |
|---|---|---|
| G01F 15/02 | (2006.01) | |
| G01F 1/66  | (2006.01) | |
| E21B 21/08 | (2006.01) | |
| E21B 21/01 | (2006.01) | |

(52) U.S. Cl.
CPC .............. *G01F 15/02* (2013.01); *E21B 21/01* (2013.01); *E21B 21/08* (2013.01); *G01F 1/662* (2013.01)

(58) Field of Classification Search
CPC ..................................................... G01F 15/02
USPC .......................................................... 702/45
See application file for complete search history.

(56) References Cited

U.S. PATENT DOCUMENTS

| | | | |
|---|---|---|---|
| 5,063,776 A * | 11/1991 | Zanker .................... | E21B 21/08 73/1.34 |
| 5,361,632 A | 11/1994 | Magnani | |
| 6,550,345 B1 | 4/2003 | Letton | |
| 7,366,621 B2 * | 4/2008 | Sprague ................ | G01F 1/3209 366/17 |
| 8,915,145 B1 * | 12/2014 | Van Orsdol ............... | F17D 3/18 73/861.04 |
| 2004/0255695 A1 | 12/2004 | Gysling et al. | |
| 2006/0272428 A1 * | 12/2006 | Rieder .................. | G01F 1/8409 73/861.357 |
| 2007/0157737 A1 * | 7/2007 | Gysling .................. | G01F 1/667 73/861.23 |
| 2009/0032304 A1 | 2/2009 | Groh | |

(Continued)

FOREIGN PATENT DOCUMENTS

| | | |
|---|---|---|
| EP | 0437872 A2 | 7/1991 |
| GB | 2343249 A | 5/2000 |
| GB | 2351810 A | 1/2001 |

(Continued)

*Primary Examiner* — Ricky Ngon
(74) *Attorney, Agent, or Firm* — Hodgson Russ LLP

(57) ABSTRACT

Apparatus for providing a mass flow measurement in respect of a fluid flowing in a conduit (11, 30), the apparatus comprising at least one non-intrusive device configured to obtain, in use, data representative of the total volumetric flow of said flowing fluid 32a,b, 20a,b), at least one device (16, 42) configured to obtain, in use, data representative of density of said flowing fluid, at least one device (38, 42, 44, 46, 43) configured to obtain, in use, data representative of the level of said fluid in said conduit, and a device (22, 40) configured to calculate, in use, a corrected mass flow of said flowing fluid using said total volumetric flow, corrected using said fluid level data, and said density data.

24 Claims, 10 Drawing Sheets

(56) References Cited

U.S. PATENT DOCUMENTS

2013/0197828 A1\* 8/2013 Paradise .................. G01F 1/90
702/45
2015/0212045 A1\* 7/2015 Raykhman ......... G01N 29/4472
73/32 A

FOREIGN PATENT DOCUMENTS

| GB | 2481666 A | 1/2012 |
| JP | 2006300845 A | 11/2006 |
| KR | 20070022838 A | 2/2007 |
| WO | 2000068652 A1 | 11/2000 |
| WO | 2009032304 A1 | 3/2009 |

\* cited by examiner

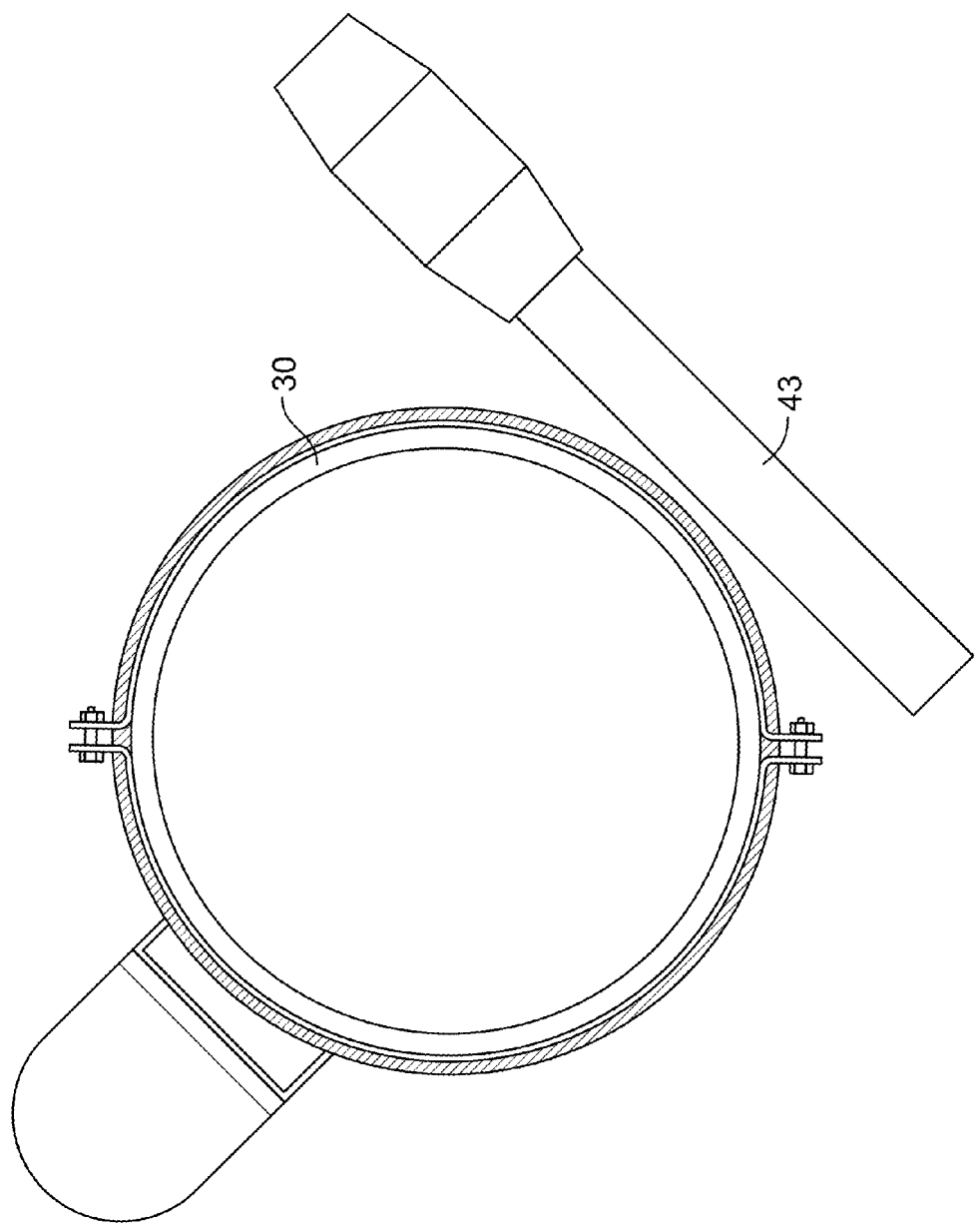

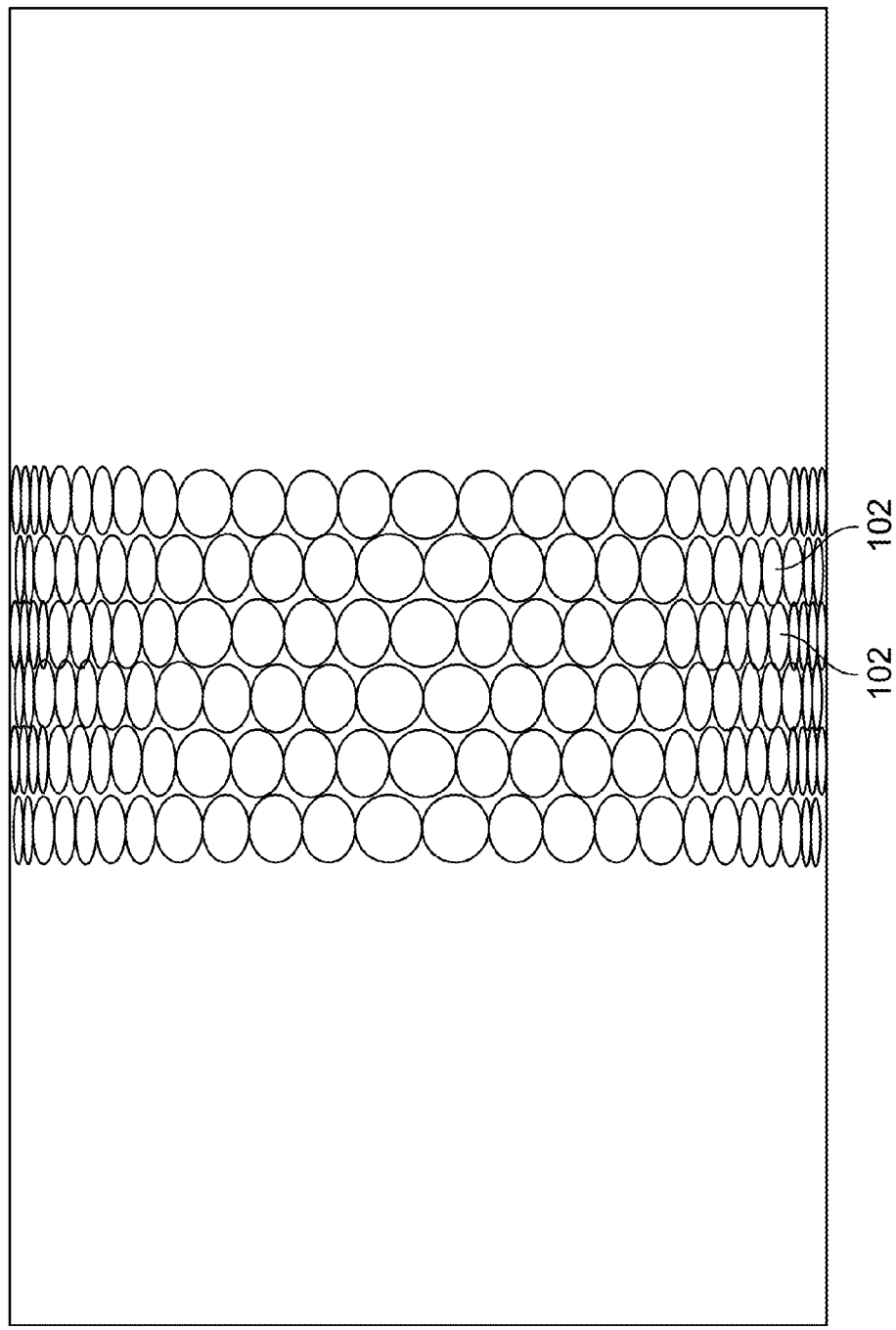

MASS FLOW MEASUREMENT APPARATUS AND METHOD

FIELD OF THE INVENTION

This invention relates to a mass flow measurement apparatus and method and, more particularly but not exclusively, to a mass flow balance meter suitable for use in drilling mud flow applications.

BACKGROUND TO THE INVENTION

Mud flow drilling rigs are well known, in which drilling fluid is pumped under pressure into a well, via a central wellbore, in order to provide lubrication and cleaning of the well during drilling, and to carry away rock and drill debris from the drill heads.

Referring to FIG. 1 of the drawings, a typical drilling rig comprises a swivel 100, a Kelly 101, a drill pipe 102, a surface casing 103, a wellbore 104 and a wellbore annulus 105. A drilling fluid flow path is defined by an inlet path and a mud flow return line 106. The drilling fluid starts at a storage pit 107, and is drawn up into a suction line 108 by one or more pumps 109, before being fed via a hose 110 to the Kelly 101 and forced down the central wellbore 104 to the drill heads 111. The drilling fluid then flows back up from the drill heads 111, via the wellbore annulus 105 and, as it rises, it flows into the mud flow return line 106. The weight of the drilling fluid is controlled in order to provide downward hydrostatic pressure in the well. In addition, the flow from the annulus is protected by a BOP (Blow Out Preventer) 114, which shuts the well in the event of a sudden outrush of mud flow, known as a kick. The mud flow return line 106 is a gravity fed line designed to give access to the return mud flow for analysis as it flows back into the processing unit 112. The processing unit 112 consists of a series of shakers and filters and a degasser and this filtering process, along with chemical additives, is used to prepare the drilling fluid for reinjection back into the well.

It is desirable to monitor the physical properties and mass flow rate of the drilling fluid, so as to enable maximum efficiency and even operability of the well drilling rig, and aspects of the present invention seek to provide a metering apparatus and method for measuring the balance of the mass flow of drilling fluid going into a well with the drilling fluid flowing back out of the well, via the mud return line, while optionally also offering a metering platform to give other essential measurements such as mud density, sonic velocity and viscosity, as may be required by particular applications. In addition, it would be desirable to provide a means for early kick detection, to give advance warning of a potential "Blow Out", in order to activate the BOP ahead of any danger.

SUMMARY OF THE INVENTION

Thus, in accordance with the present invention, there is provided apparatus for making a mass flow measurement in respect of a fluid flowing in a conduit, the apparatus comprising at least one non-intrusive device configured to obtain, in use, data representative of the total volumetric flow of said flowing fluid, at least one device configured to obtain, in use, data representative of density of said flowing fluid, at least one device configured to obtain, in use, data representative of the level of said fluid in said conduit, and a device configured to calculate, in use, a corrected mass flow of said flowing fluid using said total volumetric flow, corrected using said fluid level data, and said density data.

The apparatus may comprise at least one device configured to compute fluid height in said conduit of said flowing fluid using data representative of a cross-conduit fluid density. In an exemplary embodiment, the apparatus may comprise at least one non-intrusive device configured to obtain, in use, data representative of said cross-conduit density. Optionally, the apparatus may comprise a device configured to obtain, in use, data representative of temperature of said flowing fluid, wherein said mass flow measurement is corrected using said temperature measurement. The apparatus may further comprise a device configured to obtain or calculate a viscosity of said flowing fluid, wherein said mass flow measurement is corrected using said viscosity data.

In accordance with an exemplary embodiment of the invention, the apparatus may comprise at least one device configured to obtain, in use, data representative of fluid height in said conduit of said flowing fluid, at least one device configured to obtain, in use, data representative of the density of said flowing fluid, and at least one device configured to obtain, in use, the temperature of said flowing fluid, the apparatus further comprising means for calculating or otherwise obtaining data representative of the viscosity of said flowing fluid, means for automatically adjusting said fluid height data using said temperature data and/or said viscosity data and/or said density data to provide said fluid level data for use in calculating said corrected mass flow, thereby enabling an automatically adjusted fluid height to volumetric flow measurement of said flowing fluid to be computed using the actively corrected fluid level data to calculate gravity fed flow for a given angle and size of conduit. In this case, the apparatus may be configured to utilise calibration curve data derived using a calibration test loop including a plurality of test spools of different respective dimensions installed therein, such that repeated flow runs of different fluid densities, viscosities and flow rates can be performed with a spool or said conduit set at different respective angles to generate calibration data and calibration curve data for varying flow conditions, wherein said calibration curve data is used in real time to adjust said fluid level data for use in calculating said corrected mass flow.

An exemplary embodiment of the apparatus may comprise an array of two or more Doppler transducers, affixed to, or immediately adjacent to, an outer wall of said conduit, and configured to transmit and receive ultrasonic signals through said outer wall, and receive ultrasonic signals returned from within said conduit. Each of said plurality of transducers may be located at a different height relative to fluid level in said conduit, such that fluid level in said conduit can be determined from identifying the highest operational transducer, in use. The returned ultrasonic signals, or data representative thereof, may be multiplexed, and the apparatus may further comprise a module for generating, from data representative of said returned signals, a graphic profile of said fluid flow in said conduit.

The apparatus may comprise at least one oscillating component having a natural frequency of oscillation, communicably coupled to said conduit, said apparatus further comprising an analysis module for determining, from one or more characteristics of the oscillation of said at least one oscillating component, the density of said fluid in said conduit. The at least one oscillating component may comprise one or more piezoelectric crystals. The at least one oscillating component may be affixed to said conduit, wherein said conduit is a meter spool.

The analysis module may be configured to compute the frequency peak of said at least one oscillating component using a spectrum analysis of the oscillation thereof, and thereby to determine the density of said fluid in said conduit. The analysis module may be configured to compute a change in the peak frequency of said oscillating component(s) as a function of the level of fluid in said conduit, and thereby determine the density of fluid in said conduit when said conduit is partially full.

In an exemplary embodiment of the invention, an array of oscillating components, or data representative thereof, may be multiplexed, and the apparatus further comprises a module for generating, from data representative of said variance of oscillating component signals, topography of fluid flow in said conduit.

In one exemplary embodiment, the apparatus comprises a first density measurement device oriented along a first axis relative to said conduit and configured, in use, to obtain data representative of the density of said flowing fluid along said first axis; a second density measurement device, oriented along a second axis relative to said conduit and configured, in use, to obtain data representative of the density of said flowing fluid along said second axis; and a device configured, in use, to calculate data representative of the level of said fluid in said conduit using said data obtained from said first and second density measurement devices.

The first density measurement device may be oriented in substantially the same plane and orthogonal to the flow path of the fluid, and the second density measurement device may be oriented in a plane substantially orthogonal to the plane of said flow path of said fluid, and substantially orthogonal to said first density measurement device. The first and/or second density measurement device may comprise a nuclear densitometer, and it/they may be non-intrusive/mounted externally to the conduit containing the flowing fluid.

The fluid level data may be computed using the formula: fluid level α (is proportional to) second density measurement divided by first density measurement.

In one exemplary embodiment of the invention, the apparatus may comprise a device configured, in use, to compute from said first and second density measurements a percentage level of fluid as a percentage of the diameter of said conduit. In one exemplary embodiment, the apparatus may comprise a device configured, in use, to compute a partial empty conduit corrected volumetric flow using said total volumetric flow data and said percentage level of fluid. The partial empty conduit corrected volume flow may be calculated using the formula:

$$PVF=VF*((0.25*ACOS((0.5-\chi)/0.5)-((0.5-\chi)*SQRT(\chi-(\chi*\chi))))/0.7854)$$

where: VF=the total volumetric flow;
PVF=the partial empty conduit corrected volumetric flow; and
$\chi$=the percentage level of fluid.

The volumetric flow data may be received from at least one Time of Flight measuring device and/or at least one Doppler measuring device. The at least one measuring device may include one or more transducers which is/are non-intrusive/mounted externally to the conduit containing the flowing fluid.

Apparatus according to some exemplary embodiments may comprise a temperature measurement device and/or a pressure measurement device, such as a sensitive atmospheric pressure device. Data from said temperature measurement device and/or said pressure measurement device may be used to resolve viscosity calculations for compensation of the calculation of said volumetric flow.

Apparatus according to some embodiments of the invention may comprise at least one high sensitivity atmospheric pressure measurement device, typically mounted in the flow outlet line, and used to detect the pressure wave in the gas void that precedes an outflow kick from the well.

The apparatus according to some aspects of the invention may include a device configured to compute data representative of the mass flow of said flowing fluid derived from said corrected volumetric flow data and data representative of the density of said flowing fluid. The apparatus may comprise a device configured, in use, to generate output data representative of fluid viscosity derived from a temperature measurement and sonic velocity data. The apparatus may be configured to output data representative of said corrected volumetric flow, said mass flow, fluid density, and fluid level.

Apparatus according to some aspects may comprise a radar fluid level sensor and/or an ultrasonic fluid level sensor.

Apparatus according to some exemplary embodiments of the invention may be incorporated into an output section of a fluid mass balance system for a fluid flow loop. The fluid mass balance system may further comprise an input section comprising apparatus for providing a flow measurement in respect of a fluid flowing in a conduit, the apparatus comprising at least one device configured to obtain, in use, data representative of the total volumetric flow of said flowing fluid. A device may be provided which is configured to compare, in use, the total mass and volumetric flow of fluid flowing in said input section with said corrected mass and volumetric flow of fluid flowing in said output section of said fluid mass balance system. The fluid flow loop may comprise a mud flow loop of a drilling rig, and said fluid may comprise mud, in which case said input section is located along a portion of an inlet suction line of said mud flow loop, and said output section is located along a portion of a mud return line of said mud flow loop. The mass and volumetric flow measurement of said output section of said mass balance system may be automatically calibrated toward said inlet mass and volumetric flow measurement, wherein testing of different sensor diagnostic signals is used to indicate a period of stable output compared to input flow measurements, thereby permitting controlled incremental adjustments of said output measurement to the input measurement over time.

In accordance with a further aspect of the present invention, there is provided a method for providing a mass flow measurement in respect of a fluid flowing in a conduit, the method comprises non-obtrusively obtaining data representative of the total volumetric flow of said flowing fluid, obtaining data representative of density of said flowing fluid, obtaining data representative of the level of said fluid in said conduit, and calculating a corrected volumetric flow of said flowing fluid using said total volumetric flow and fluid level data, and calculating said mass flow using said corrected volumetric flow and said density data.

The method may comprise the steps of obtaining first data representative of the density of said flowing fluid along a first axis relative to said conduit; obtaining second data representative of the density of said flowing fluid along a second axis relative to said conduit; and calculating data representative of the level of said fluid in said conduit using said density data obtained in respect of said first and second axes.

The first density data may be obtained from a density measurement device oriented in substantially the same plane and orthogonal to the flow path of the fluid, and the second density data may be obtained from a density measurement device oriented in a plane substantially orthogonal to the plane of said flow path of said fluid, and substantially orthogonal to said first density measurement device.

The fluid level data may be computed using the formula: fluid level α (is proportional to) second density measurement divided by first density measurement. The method may comprise the step of computing from said first and second density measurements a percentage level of fluid as a percentage of the diameter of said conduit.

The method according to some aspects of the invention may comprise computing a partial empty conduit corrected volumetric flow using said total volumetric flow data and said percentage level of fluid. The partial empty conduit corrected volume flow may be calculated using the formula:

$$PVF=VF*((0.25*ACOS((0.5-\chi)/0.5)-((0.5-\chi)*SQRT(\chi-(\chi*\chi))))/0.7854)$$

where: VF=the total volumetric flow;
PVF=the partial empty conduit corrected volumetric flow; and
$\chi$=the percentage level of fluid.

For drilling applications, the apparatus may be required to give a mass flow rate, outputting volume flow, mass flow and density of the flowing liquid or mud. To achieve this, additional sensors may be utilised including temperature. In addition to the vertical cross pipe density measurement, there is a low horizontal density chord which can be used to determine the density of the liquid or mud even when the level of liquid or mud is very low in the pipe. In addition, non-intrusive level gauges may be used to resolve the liquid level. This in turn can be used to convert the horizontal cross pipe density measurement into a liquid or mud density calculation by making adjustment for liquid or mud height in the pipe, and conversely the liquid or mud level can be derived from reversing the calculation.

The apparatus may utilise several different level measurement techniques, such as radar, ultrasonic (sonar), nucleonic level gauges. The response of these sensors is different during changes in flowing conditions. For instance radar may measure the level as being the surface of flowing mud fluid regardless of any gas entrainment in the mud. However the nucleonic level measurement will measure the level of mud liquid only. The difference between these measurements can therefore reveal a third measurement of gas entrainment which can be calculated by comparing the difference between the two sensor technologies. In practice there are many additional derived measurements achievable by calculating the differences between sensor technologies during different flowing conditions, giving values for gas entrainment and percentage of solids. In addition, by using a dual Doppler measuring method for partially full pipe flow, where the accuracy of the Doppler measurement is increased by correlation of two measurements, the changes in correlation compared to the raw Doppler flow rate enables the viscosity of the fluid to be derived. Whenever the flow rate changes, the viscosity at that flow rate and fluid height can be derived. Consequently by computation of the viscosity at different fluid heights, the rheology of the flowing fluid can be inferred.

In addition to the instrumentation described briefly above, aspects of the invention may incorporate a method to infer the density of the liquid or mud in the partially full pipe by vibration of a meter spool. The spool flanges are fixed to the adjoining pipe by means of rubber, or similar vibration deadening, gaskets to decouple the mass. The natural frequency of the oscillation of the spool (or conduit) is therefore proportional to the mass of the spool and its contents, and so the mass of the drilling fluid can be determined by comparison to the mass of the empty spool, provided the level of the liquid or mud in the partially full pipe is known. One example for measuring oscillation of the spool vibration involves the use of piezoelectric crystals. The piezoelectric crystals have a natural frequency of oscillation. When physically joined to the spool by adhesion or mechanical means, the oscillation frequency of the piezoelectric crystal changes accordingly, since the crystal must move the mass of the spool in order to oscillate. The change in the natural oscillation frequency of the crystal is therefore proportional to the mass of the spool to which the crystal is attached, and its contents. Consequently, a density measurement of the spool and its contents can be determined by computation of the frequency peak of the crystal using spectrum analysis of the crystal oscillation. This method can be externally affixed to or clamped on to any pipe or conduit. As well as providing an overall mass measurement, the reaction of an individual crystal oscillation to the mass of the pipe or conduit will contain some localised information, such that an array of such crystals along the length of the conduit will enable density changes to be tracked by measuring the discrete changes in mass as the fluid flows past the crystals attached to the conduit, and may also infer velocity of fluid. Similarly an array of crystals 102, as illustrated in FIG. 7a of the drawings, around the circumference of the spool, or the perimeter of a conduit will measure discrete differences when being above and below the level of fluid in the conduit, and may infer level of the fluid. Whereas, surrounding an entire spool or conduit section with perimeter arrays of crystals in rows along the length of a section of conduit will enable externally mounted clamp-on topography of the fluid flow within the conduit. Alternative exemplary embodiments may use electromagnetic coils to vibrate the spool, although any mechanical means to oscillate the pipe or conduit that may be electronically measured may be used. The sensors 102 may be multiplexed to reduce the amount of equipment needed to measure the array of sensors. This makes the method and apparatus particularly advantageous, as it applies to using the pipe spool's natural oscillation to measure the density of liquid or mud non-intrusively in a partially full pipe environment, without the need for ionizing radiation fields.

Further, for drilling applications, the apparatus may be required to provide a method of early kick warning and detection. The gas void offers the least resistance to any changes in the mud flow outlet. Therefore, it has been determined by the inventors that, in the event of a sudden outrush of either liquid or gas from within the well (known as a kick), it will affect the gas void gas flow rate in the outlet flow line well before it is detectable by any liquid flow rate changes. Therefore, to summarise, the kick effect is first manifest at the outlet of the well as a forward moving gas pressure wave.

Thus, an exemplary embodiment includes at least one highly sensitive atmospheric pressure sensing device (transmitter) for measuring any small variations in the gas pressure in the mud return flow circuit. This can be mounted at any point after the well head and, in one exemplary embodiment, the sensitive pressure measurement device may be included in the apparatus mounted on the return line, or on the flow meter spool. In addition, non intrusive gas flow transducers in the gas void may detect any significant changes in the gas flow rate. Any sudden outrush from the well is therefore detectable as a pressure change from the forward flow pressure wave, and is easily and cleanly detected over a threshold to give an activation signal to the BOP (Blow Out Preventer) safety valve system, to lock in the well ahead of any serious event. Atmospheric pressure transmitter devices are typically well-tested and reliable devices, such that they can be trusted not to give false signals. Exemplary embodiments of the invention may use multiple pressure sensors as a SIL rated system, therefore offering an exemplary safety system to give advance warning of kicks in time to prevent blow outs from the well, and rapid flow rate changes can be measured in conjunction with the pressure, for early kick detection.

These and other aspects of the present invention will be apparent from the following description of exemplary embodiments of the present invention.

BRIEF DESCRIPTION OF THE DRAWINGS

Embodiments of the present invention will now be described by way of examples only and with reference to the accompanying drawings, in which:

FIG. 4b is a schematic diagram illustrating the principle of the nuclear rod level gauge which may be used to resolve very low level measurements in the output mud return line, and in turn enable accurate back calculation of density from the vertical densitometer measurement assembly of FIG. 4;

FIG. 7a is a schematic diagram illustrating an array of sensors arranged around the perimeter of a spool or conduit in apparatus according to an exemplary embodiment of the present invention.

DETAILED DESCRIPTION

Figure 1:
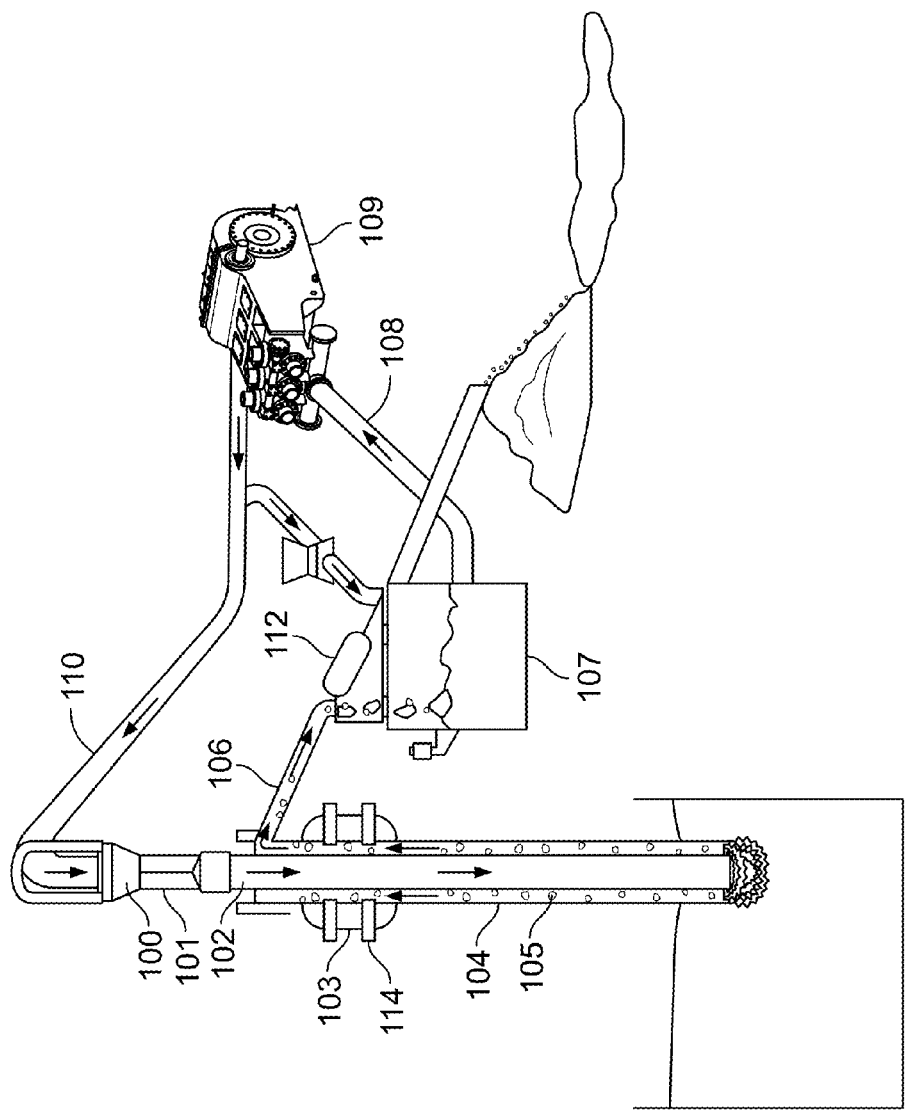
FIG. 1 is a schematic diagram illustrating a mud flow loop in a conventional mud flow drilling rig.
Figure 2:
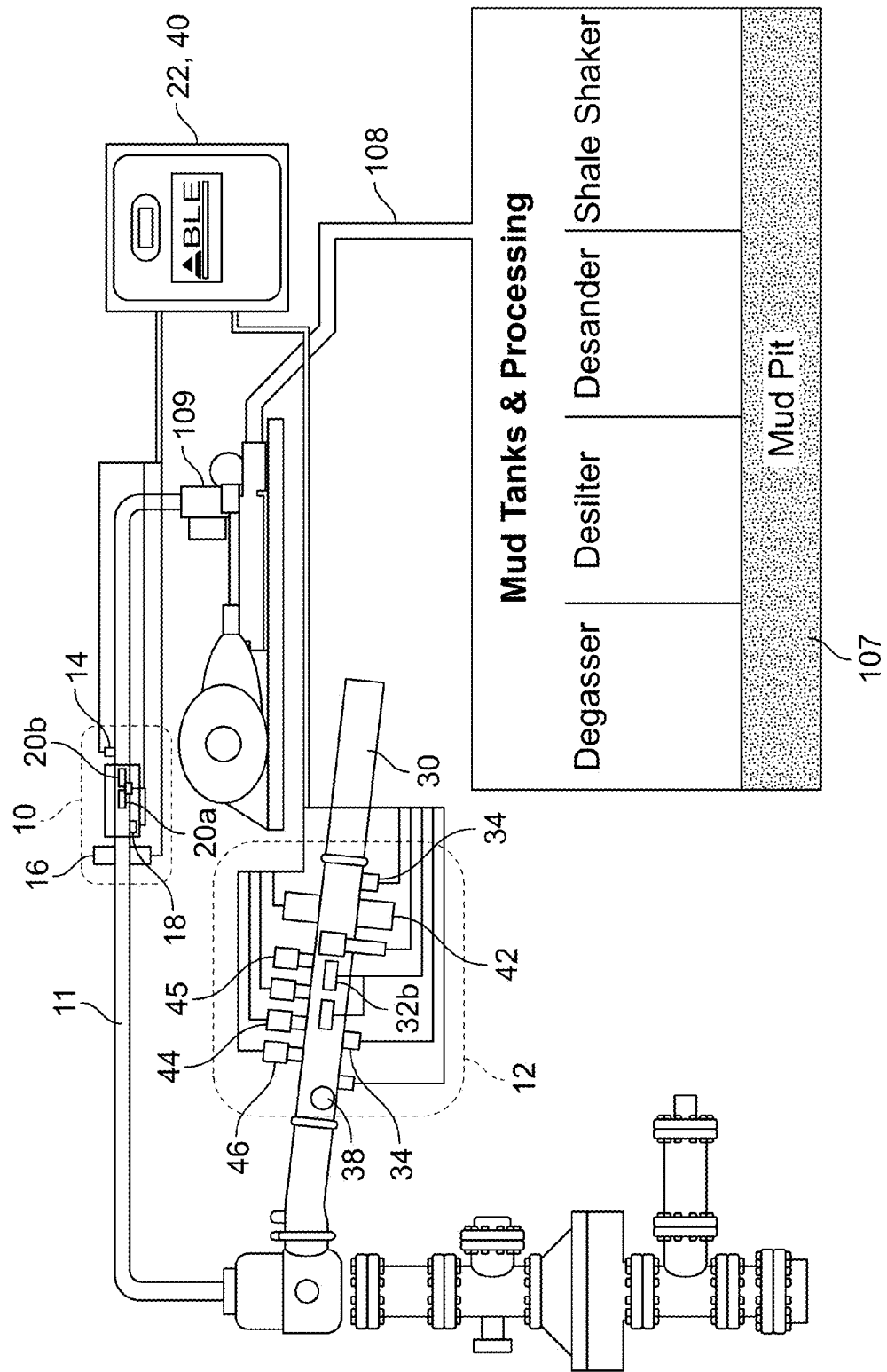
FIG. 2 is a schematic diagram illustrating a mass flow measurement apparatus according to an exemplary embodiment of the present invention, installed on the drilling fluid flow loop of a mud flow drilling rig.

Referring to FIG. 2 of the drawings, there is illustrated schematically a drilling mud flow loop including mass flow measurement apparatus according to an exemplary embodiment of the present invention. The illustrated mass flow balance metering application for mud drilling includes an inlet suction line mud flow metering assembly 10 and an output mud return line measurement assembly 12, and is configured to enable the comparison of two main measurements of the mass flow of the drilling mud in and out of a well. The illustrated apparatus is particularly suitable for applications where continuous measurement of fluid flow is required in a conduit which is usually only partially full, such as in the case of oil drilling where mud flow is taken away by means of a gravity fed line at an angle, such that the fluid flows along the bottom of the pipe: the flow during drilling tends to operate from 0% to little more than 50% full, whilst the apparatus may measure flow from 0% to 100% full. However, the proposed meter has many other applications aside from mud drilling, and can provide a fully non-intrusive (partially full) pipe mass flow metering system which can measure fluid flow such that the entire phase range from 100% liquid flow through to 100% gas flow is achieved whilst, optionally, metering the individual phase components as separate metered outputs, if required.

Figure 3:
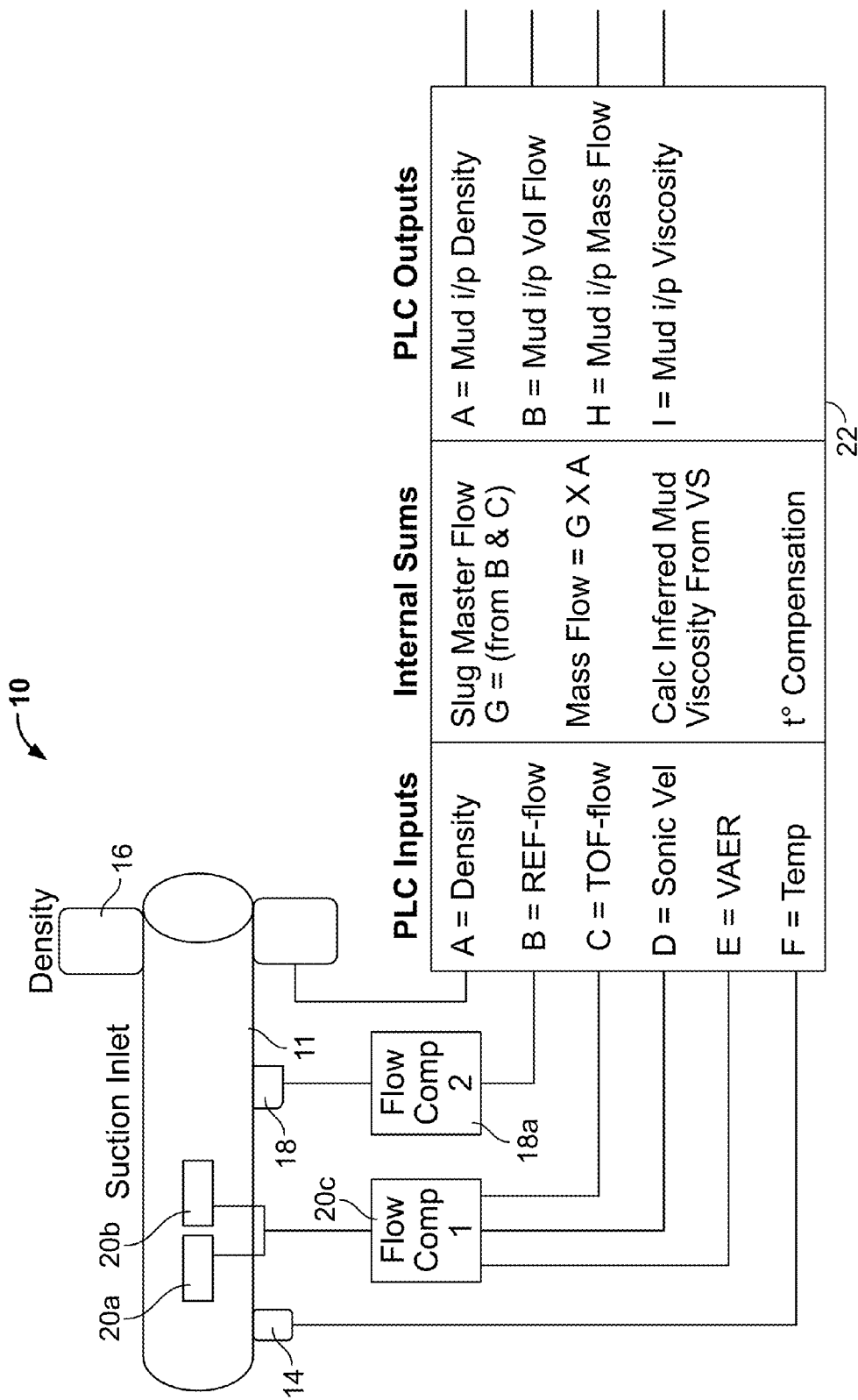
FIG. 3 is a schematic diagram illustrating some of the principal components of the inlet suction line mud flow metering assembly of the apparatus of FIG. 2.

Referring additionally to FIG. 3 of the drawings, there is illustrated a section of a conduit 11 through which fluid (in this case, mud) flows. Although a pipe-like conduit is shown in FIG. 3, which illustrates schematically a portion of the inlet suction line of a drilling rig mud flow loop, it will be appreciated that the measurement apparatus can be used with other types of fluid conduits/containers.

A first measurement device is fitted to the conduit 11. In the example, the first measuring device comprises a Time of Flight (TOF) flow meter 20a, 20b that provides a dual path TOF flow measurement via a first processing unit 20c. In use, the TOF measuring device sends pulses from one of its transducers 20a through the fluid in the conduit 11 and measures the time it takes for the sonic waves to reach the other transducer 20b and back. In the example shown, the measurement device is non-contact and so flow throughput of the fluid in the conduit is not inhibited, which results in reduced installation costs. Furthermore, the lack of mechanical components ensures routine calibration and maintenance requirements are reduced, thereby reducing operating costs.

In the case of a clamp-on measuring device as shown in FIG. 3, the transducers are mounted on the outside of the conduit 11 and the sound is conducted through the conduit. In other embodiments, wetted transducers are just in contact with the fluid at the conduit wall to cause minimal disturbance to the flow. In yet another embodiment, the transducers can be fully inserted into the fluid. The clamp-on transducers can be mounted in reflect, where the sonic wave is sent against the opposite wall and back.

When the fluid in the conduit 11 flows, it affects the propagation of the sonic pulse, with a different effect upstream and downstream, which can be measured and used to calculate the velocity of the flowing fluid. The volumetric flow can then be calculated by the TOF flow computer component 20c, which may be located remotely from the transducers, based upon the conduit internal area. Pressure and/or temperature inputs can be used to make corrective adjustments for viscosity, as will be described in more detail later.

The conduit 11 is also fitted with a Doppler technology-based measuring device 18 that provides Doppler flow measurement. As with the TOF measuring device, the transducer(s) 18 may be clamp-on or located at least partially inside the conduit 11. The Doppler transducers send pulses through the fluid in the pipe from a transmit transducer and sound is reflected back from entrained particles, bubbles or shear layers in the fluid to a receive transducer. The frequency of the reflected wave is dependent upon the velocity of the entrained particle, bubble or shear layer in the fluid. A flow computer component 18a can convert this frequency shift back into a velocity measurement. The flow computer 18a typically collects all the velocity measurements and processes them into a velocity rate. As with the TOF measuring device, the volumetric flow can then be calculated based upon conduit internal area using known techniques.

The illustrated embodiment of the inlet assembly 10 further comprises a temperature sensor 14 for enabling corrective adjustments to be made for viscosity, whereby inferred mud viscosity can be derived as a product of temperature and sonic velocity. A density meter 16 is also provided, which may comprise a Coriolis meter, and which measures density from a portion (e.g. 2.5 cm) take of the inlet line, such that mass flow can be derived from a product of volumetric flow and density of the fluid. However, in an alternative exemplary embodiment, a nuclear densitometer may be employed, which enables a fully clamp-on, non-intrusive mass flow metering combination. Outputs from the temperature sensor 14, the density meter 16 and the first and second flow computers 20c, 18a are fed into a computing device 22, which may comprise a PLC. This inlet measurement may, for example, be effected using a multiphase flow meter such as that described and claimed in GB Patent Publication No. GB2481666A.

It will be appreciated that the inlet measurement is performed on the suction line side of the drilling loop, before or after the pumps. This flow is clean mud slurry and is always a full pipe. Slurry is well suited to Doppler Reflexor operation and may also be suitable for TOF ultrasonic flow measurement due to the smooth consistency of the mud. A combination of these methods provides an advantageous dual technology for many different volumetric flow metering applications, as referenced above.

Figure 5:
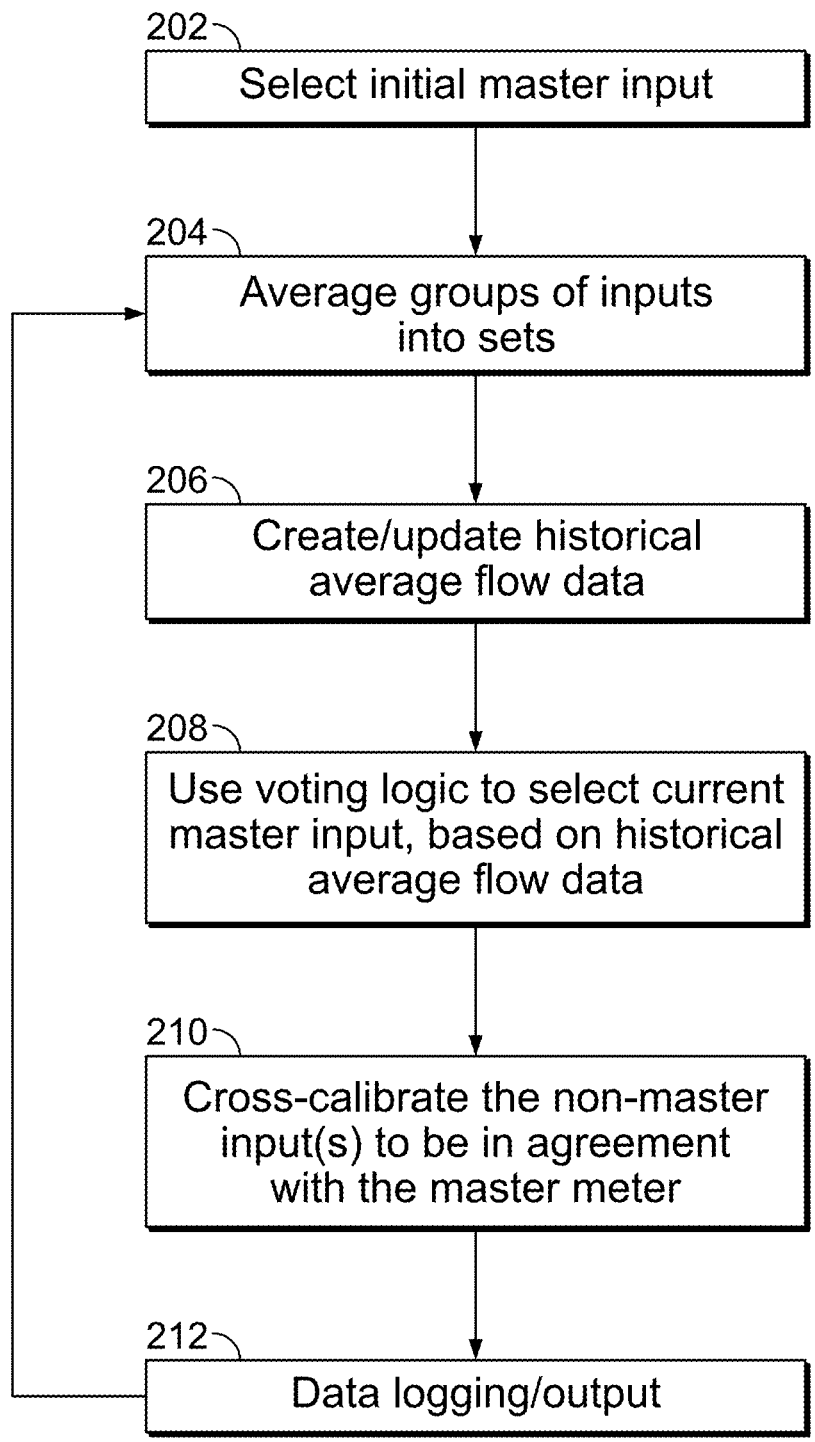
FIG. 5 is a flow diagram illustrating steps performed by the flow metering apparatus of FIG. 2.

The computing device 22 receives as its inputs a density measurement A, a flow velocity rate B from the second flow computer 18a, three inputs from the first flow computer 20c: a TOF flow rate C, a sonic velocity measurement D and a VAER signal E, and a temperature measurement F. The outputs provided by the computing device 22 are inlet mud mass flow H, mud density A, the mud volumetric flow rate G, and the mud viscosity I, which are calculated by the computing device using the above-mentioned inputs A-F, as described below. Thus, the mud volumetric flow is derived using the output (B) from the Doppler technology-based measuring device 18 and the output (C) from the TOF measuring device 20, and FIG. 5 is a flowchart of steps that can be performed by the computing device 22 to derive the volumetric flow rate G. At step 202, initialisation takes place and, optionally for some embodiments, where there are more than two inputs/measuring devices, groups of inputs may be averaged into sets at step 204. At step 206, the computing device 22 creates/updates a store of historical average flow data. The number of past measurement samples that are averaged, and the time period during which samples are collected, are variable parameters that can be selected during the set up of the apparatus so as to adjust sensitivity of the voting logic process. The measurement sample shift registers are regularly updated so that older samples are overwritten as the new samples are taken at the start of the listing.

At step 208, a voting logic technique is used to compare the incoming calibrated flow measurements from the different flow computers 20c, 18a to the historical average data, to determine which incoming measurement is considered to be the most reliable under the present changing process conditions in comparison with the historical trend. The incoming meter input having a historically stable measurement with low mean deviation that is nearest the historical average data is selected as the master input. The master flow measurement/input is expected to be the most accurate flow measurement during perfect conditions. The measurement from the selected master meter is assessed by considering the mean deviation of flow measurements over a past number of readings. The amount of deviation can be a selectable variable during the set-up of the apparatus. The deviation indicates the reliability of the flow data for comparison with the historical trend. Provided that the master meter is not in fault and that also the/each other flow meter is measuring within the required bandwidth (means may be provided to perform checks to see if this is the case), then all the other (non-master) input measurements may be very gradually adjusted to be in agreement with the master meter over an extended period of time, e.g. at step 210. This process is referred to herein as cross-calibration. Volumetric flow data G, thus collected, is output and/or logged at step 212.

Referring back to FIG. 3 of the drawings, the mud input mass flow H can derived from a product of the volumetric flow and the density input A. Finally, the inferred mud input viscosity I can be derived as a product of temperature F and sonic velocity D. "Sonic velocity" means the speed of sound through the fluid, which can be calculated (the first or second flow computer 20c, 18a) by measuring the time taken (in milliseconds) for the ultrasound signals to pass from one transducer of the measuring device to the other, and differs for different fluids. In the illustrated example, the sonic velocity data D is derived from the first flow computer 20c associated with the TOF measuring device, but it could alternatively or additionally be obtained from the Doppler technology-based measuring device.

Figure 4:
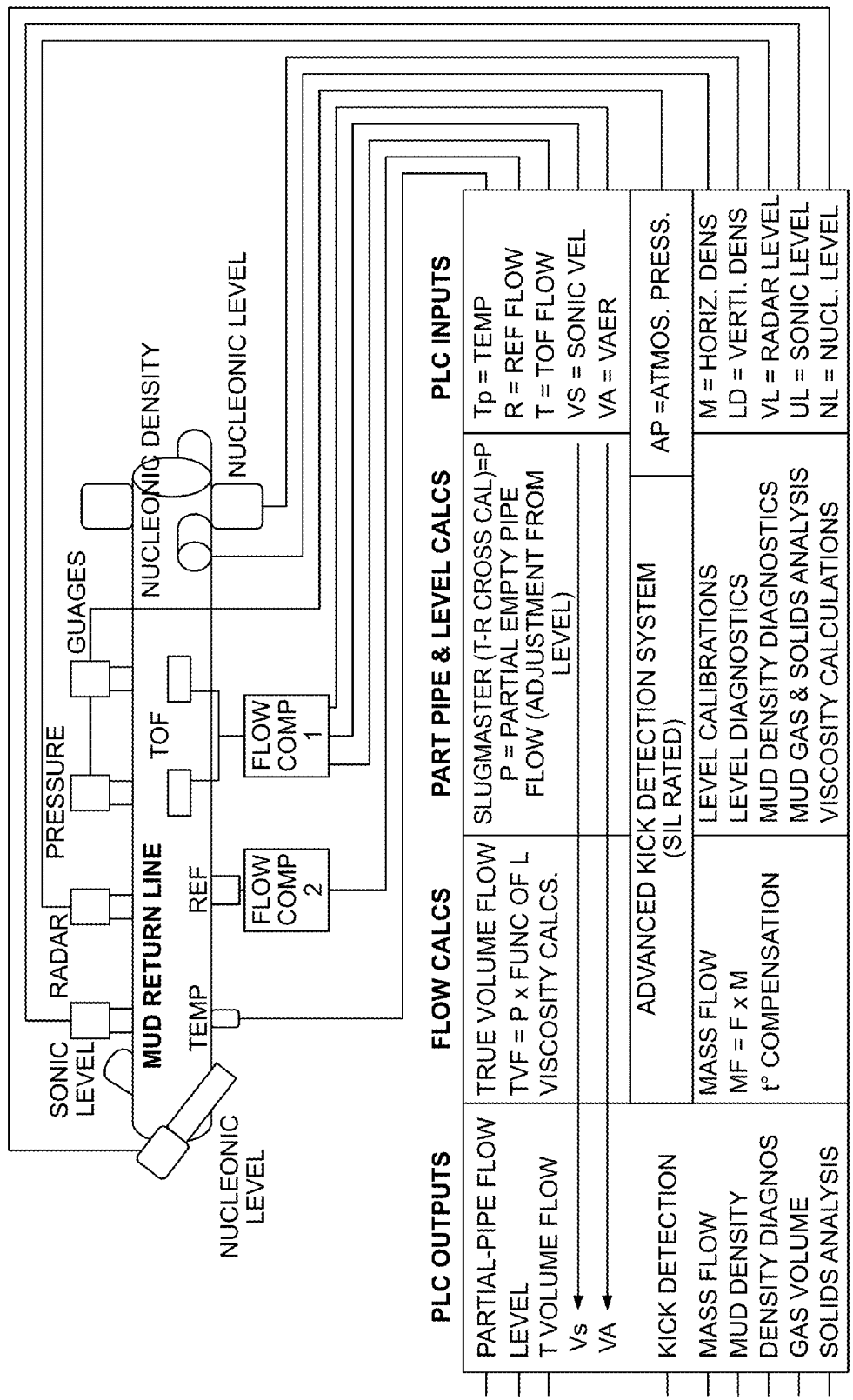
FIG. 4 is a schematic diagram illustrating some of the principal components of the output mud return line measurement assembly of the apparatus of FIG. 2.

Referring now to FIG. 4 of the drawings, well output measurements are taken on the mud flow return line, schematically illustrated in FIG. 4 as a portion of a conduit 30. The content of this gravity fed flow line is considerably different to that of the input line. This portion of the mud flow loop tends to comprise partially empty pipe flows, with the mud carrying various suspended solid debris of rock and drill bit fragments along with crude oils, depending upon the prevailing drilling conditions. The mud may also be water based or oil based. However, just as with the inlet, there may be periods where the TOF flow meter operates as the primary method during periods of flow having a low level of debris entrainment, whereas it will be the Doppler reflexor that is the primary method for higher levels of debris and/or gas entrainment.

As with the mud input assembly 10, in the mud return assembly 12, a first measurement device is fitted to the conduit 30. In the example, the first measuring device comprises a Time of Flight (TOF) flow meter 32a, 32b that provides at least one TOF flow path measurement via a first processing unit 32c. In use, the TOF measuring device sends pulses from one of its transducers 32a through the fluid in the conduit 30 and measures the time it takes for the sonic waves to reach the other transducer 32b and back. In the example shown, the measurement device is non-contact and so flow throughput of the fluid in the conduit is not inhibited or restricted, and so does not affect the flow profile or introduce potential blockage points, and results in reduced installation costs. Furthermore, the lack of mechanical components ensures routine calibration and maintenance requirements are reduced, thereby reducing operating costs.

In the case of a clamp-on measuring device as shown in FIG. 4, the transducers are mounted on the outside of the conduit 30 and the sound is conducted through the conduit. In other embodiments, wetted transducers are just in contact with the fluid at the conduit wall to cause minimal disturbance to the flow. In yet another embodiment, the transducers can be fully inserted into the fluid. The clamp-on transducers can be mounted in reflect, where the sonic wave is sent against the opposite wall and back.

When the fluid in the conduit 30 flows, it affects the propagation of the sonic pulse, with a different effect upstream and downstream, which can be measured and used to calculate the velocity of the flowing fluid. The volumetric flow can then be calculated by the TOF flow computer component 32c, which may be located remotely from the transducers, based upon the conduit internal area. Pressure and/or temperature inputs can be used to make corrective adjustments for viscosity, as will be described in more detail later.

The conduit 30 is also fitted with a Doppler technology-based measuring device 34 that provides Doppler flow measurement. As with the TOF measuring device, the transducer(s) 34 may be clamp-on or located at least partially inside the conduit 30. The Doppler transducers send pulses through the fluid in the pipe from a transmit transducer and sound is reflected back from entrained particles, bubbles or shear layers in the fluid to a receive transducer. The frequency of the reflected wave is dependent upon the velocity of the entrained particle or bubble in the fluid. A flow computer component 34a can convert this frequency shift back into a velocity measurement. The flow computer 34a typically collects all the velocity measurements and processes them into a velocity rate. As with the TOF measuring device, the volumetric flow can then be calculated based upon conduit internal area using known techniques.

The illustrated embodiment of the return assembly 12 further comprises a temperature sensor 36 for enabling corrective adjustments to be made for viscosity, whereby inferred mud viscosity can be derived as a product of temperature and sonic velocity. A density meter 38 is provided, which measures density from a portion of the return line, such that mass flow can be derived from a product of volumetric flow and density of the fluid. In an exemplary embodiment, a nuclear densitometer may be employed, which enables a fully clamp-on, non-intrusive mass flow metering combination. Outputs from the temperature sensor 36, the density meter 38 and the first and second flow computers 32c, 34a are fed into a computing device 40, which may comprise a PLC.

In the mud return line assembly 12, flow measurements need to be further compensated for partial empty pipe conditions, such that outlet mud mass flow can be accurately determined. The volume flow measurements fed into the computing device inputs are based on full pipe conditions, so level measurements need to be additionally fed to the input of the computing device 40 to enable the above-mentioned compensation to be effected.

In the illustrated example, the fluid level is derived from a combination of dual nuclear densitometer measurements facilitated by a second nuclear densitometer 42 oriented substantially orthogonally to the first densitometer 38, together with outputs from a radar level gauge 44 and an ultrasonic level sensor 46, as is explained in more detail below. In addition, a fourth clamp-on level method uses a nucleonic rod gauge 43 (see also FIG. 4b of the drawings).

Thus, the density of the mud is measured using two stages of nucleonic density measurement. A collimated nucleonic beam is passed across the bottom ⅛ section of the pipe area, allowing a density measurement even during partial empty pipe conditions. The allowable density change of the densitometer measurement will be restricted for the range of mud only, with "a last good value" sample and hold system to prevent reaction to partial empty pipe conditions that periodically drop below the collimated beam threshold. This will also be dampened to give a mean density during changing conditions. Another nuclear density measurement is taken vertically through the whole pipe area. Since the mean density of the mud flow product is known from the collimated beam from the ⅛ pipe measurement point, this is used to span the density reading from the vertical densitometer, which allows a pipe level measurement to be made. In addition to this nuclear density based level measurement, the return mass flow apparatus employs a radar level gauge. As well as the radar method for level and the nuclear density level gauge there is also an ultrasonic level gauge. Each are independently calibrated instruments. The difference between the three level methods is derived as a diagnostic tool for assessing the material properties of the drilling mud. A further rod nuclear gauge 43 may provide a fourth technology method for deriving liquid level as it is able to accurately resolve the very low level measurement for the periods when the fluid level is below the collimated density beam measurement from densitometer 38. In turn, this enables the density of low levels of fluid to be back calculated accurately from the vertical densitometer 42. More than one sensor of each type may be deployed in the application.

Figure 4A:
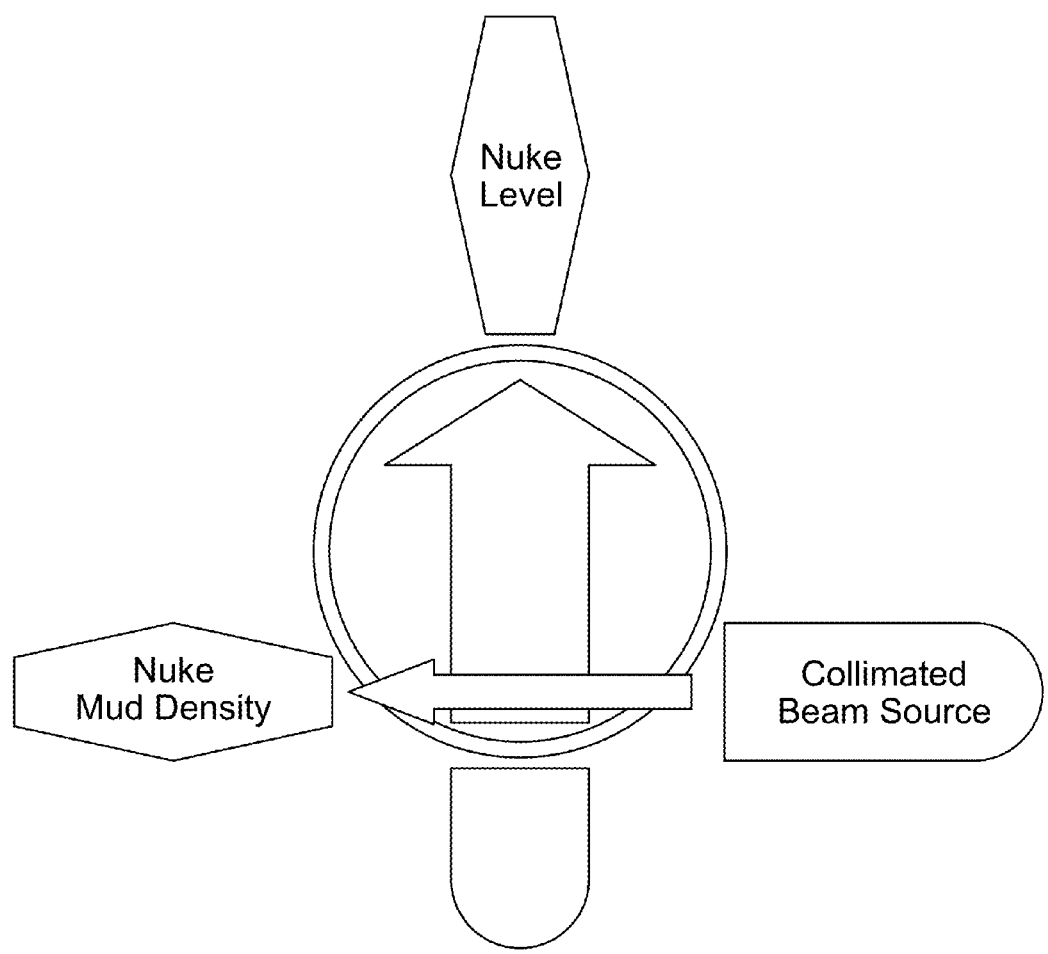
FIG. 4a is a schematic illustration illustrating the principal of the use of two nuclear densitometers to resolve density and level in the output mud return line measurement assembly of FIG. 4.

FIG. 4a illustrates the method of using the two nucleonic densitometers to resolve density and level. It can be seen that the collimated beam across the lower section of the pipe is in the section that is expected to be full for the majority of the time. A sample and hold density signal processing is employed to retain measurement through low dips in the mud level. This beam is setup at approximately 10 to 15% of the diameter of the pipe and gives the average mud density. The density measured vertically across the whole pipe will be proportional to the level of the mud, in respect to the average mud density. i.e. the vertical nucleonic device provides a secondary method of measuring density since the liquid level is independently measured using other technology. Thus, it can be seen from FIG. 4a, that the nuclear density detectors are setup in the illustrated arrangement so that the collimated beam across the pipe gives the density of the mud, and the vertical density measurement gives the level of the mud as a product of the collimated beam density by computation, where:

% level=vertical density/collimated beam density and the collimated beam density is the last good value held in the sample and hold register.

In summary, the inputs to the computing device 40 are:

Temperature $T_p$, obtained from the output of the temperature sensor 36;

The output R from the Doppler reflexor flow computer 34a;

The output T from the TOF measurement device flow computer 32c;

Sonic velocity $V_s$ which can be obtained from either of the two flow computers 32c, 34a;

VA—the Vaer (voltage aeration) signal from the first flow computer 32c;

The mud density M from the output of the first densitometer 38;

Level density LD from the output of the second densitometer 42;

Level gauge LG from the output of the third nucleonic detector 43;

The radar level VL from the output of the radar level gauge 44;

Sensitive pressure AP from the output of the atmospheric pressure gauge 45; and The sonic level UL from the output of the ultrasonic level sensor 46.

Thus, the mud return line measurement requires more apparatus to resolve the mass flow, than that of the inlet line. Just as for the mud input flow, the meter outputs a volumetric flow based on an assumed full pipe condition, and a first clamp-on nuclear densitometer is used to measure the density of the mud flow via a collimated beam at the bottom of the pipe. In this case, however, a second, horizontal densitometer measurement is used to resolve the level of mud in the pipe. In addition, there are radar, ultrasonic and nucleonic level gauges measuring the transient height of the mud as it passes along the mud return line.

Before the volumetric flow and mass flow calculations can be performed, it is necessary to apply compensation for partially empty pipe conditions. This is achieved in the computing device 40 by using a corrective formula which converts a percentage level in the pipe into a pipe area adjustment of the volumetric flow. The formula states that:

$$PVF=VF*((0.25*ACOS((0.5-\chi)/0.5)-((0.5-\chi)*SQRT(\chi-(\chi*\chi))))/0.7854)$$

where: VF=the measured volumetric flow (from one or other of the flow computers);

PVF=the partial empty pipe corrected volumetric flow; and $\chi$=the percentage level of mud as a percentage of the diameter of the pipe.

Finally, the corrected volume flow rate PVF is converted to a mass flow output derived from a product of volume flow and density. As with the mud input line assembly, the mud return line assembly 12 may include a temperature measurement which can be provided to the computer device 40 as an input from the TOF flow computer 32c, and used to calculate inferred viscosity as a product of sonic velocity against temperature, depending on the availability of the sonic velocity and vaer signals from the TOF flow computer 32c during partial empty pipe conditions on the mud return line. Additional outputs made available from the computing device 40 are the mud density, the volumetric flow rate, and diagnostic information from comparing the sensor levels and the densitometer level measurements as an indication of changes in the fluid properties of the mud return line.

Thus, in summary, the apparatus according to the described exemplary embodiment of the present invention, calculates the mud flow into the well and calculates the mud flow back out of the well. Timing adjustments may be applied according to the flow rate in order to enable synchronisation of the return mud density measurement to the mud section line inlet density measurement, thereby enabling an instantaneous mass flow comparison of the mud product into and out of the well.

In one exemplary embodiment, enhanced Doppler operation may be employed. In this case, the apparatus uses two or more ultrasonic Doppler flow metering points which are separated by a specific distance.

In some exemplary embodiments, the mud return line measurement assembly 12 may be further enhanced by the addition of gas detection and/or compact gas chromatography instrumentation to analyse the gas void in the return line during drilling operations. Such gas analysis may provide the earliest warning of gas release from the formation during drilling operations to give advance warning of flammable gases, which can be used to prevent the risk of fire and explosion.

Figure 6:
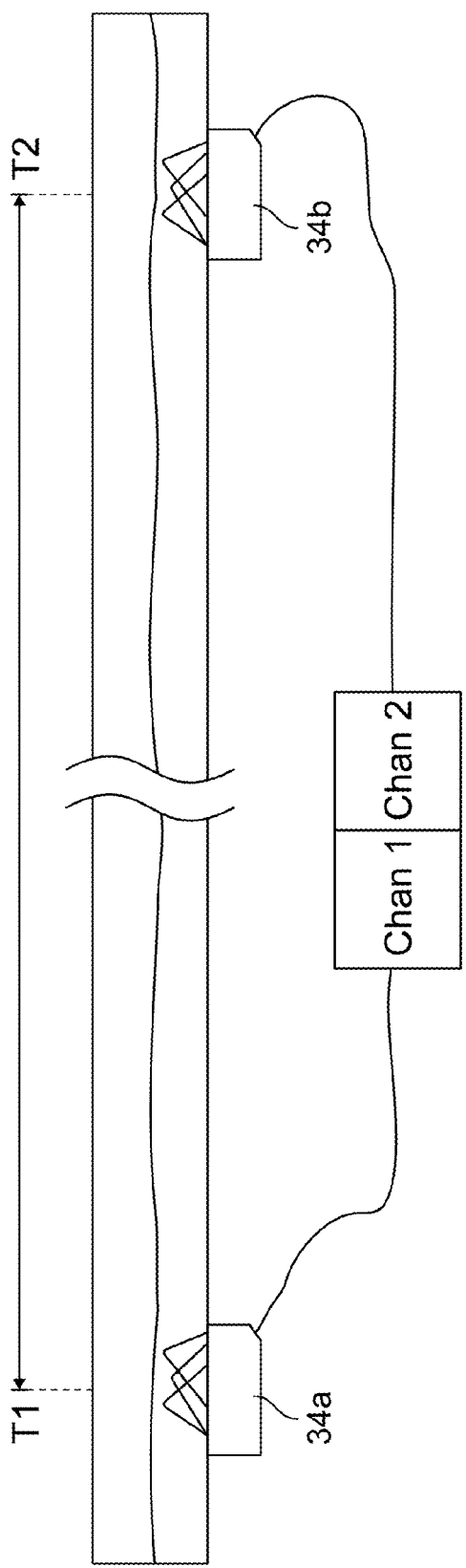
FIG. 6 is a schematic diagram illustrating the principle of Doppler flow velocity measurement in relation to exemplary embodiments of the present invention.

Referring to FIG. 6 of the drawings, the Doppler flow velocity at point and time T1 on channel 1 gives a flow signature (no smoothing or averaging). There is a degree of uncertainty in the flow velocity measurement at any one instant as it is an average of the velocity of various reflections and particles in the liquid. The Doppler flow velocity at point and time T2 on channel 2 also gives a flow signature (no smoothing or averaging). Again, there is a degree of uncertainty in the flow velocity during the same instant which may be as much as +−10% or more depending on the flowing conditions. However, using the two measurements in two locations and the velocity rate from the Doppler meters 34a, 34b, gives a good indication of the timing between T1 flow reaching T2. This method may be referred to as "Predictive Correlation Processing". Using correlated flow computation, the flow data area profile at T1 and T2 may be overlaid accordingly, and moved to align and identify the nearest match (the smallest sum of difference over a time period, in the location indicated by the two Doppler velocity rates). The closest match point determines the exact time for the flow to travel from T1 to T2 and this has been shown to offer far superior accuracy to the Doppler flow calculation at either T1 or T2, and allows reduced uncertainty of velocity to be ascertained. The correlation of the two independent Doppler measurement points enables an improved fluid velocity calculation that is superior relative to the use of an average of the two measuring Doppler "paths". The measurement at each point may then be cross calibrated to the correlated calculation thus improving the flow rate calculation. Thus, this aspect of the invention will work even for interrupted measurements, because the velocity of the interrupted flow measurements can still be calculated between T1 and T2, giving a more robust measurement principle. This is especially advantageous for liquid measurement with partial empty pipe, where the liquid phase travels along the bottom as shown, since the liquid is distinctly separated from the gas phase. The fluid height is then independently measured using non-intrusive instrumentation such as clamp-on nucleonic gauges or non-contact level instrumentation.

Yet various aspects of the invention can also give good improved uncertainty in full pipe, where the full volume measurement is of the total volume (liquid and gas) flow rate. Again the correlation of the two independent Doppler measurement points enables an improved fluid velocity calculation over a single measuring point, and again is superior to an average of the two measuring Doppler "paths". In this case the clamp-on, cross pipe density nucleonic gauge may be used to resolve the gas and liquid phase fractions, and again, there is much improved uncertainty of measurement compared to conventional Doppler, with far greater accuracy than the average of the two Doppler flow measurements T1 and T2.

Figure 7:
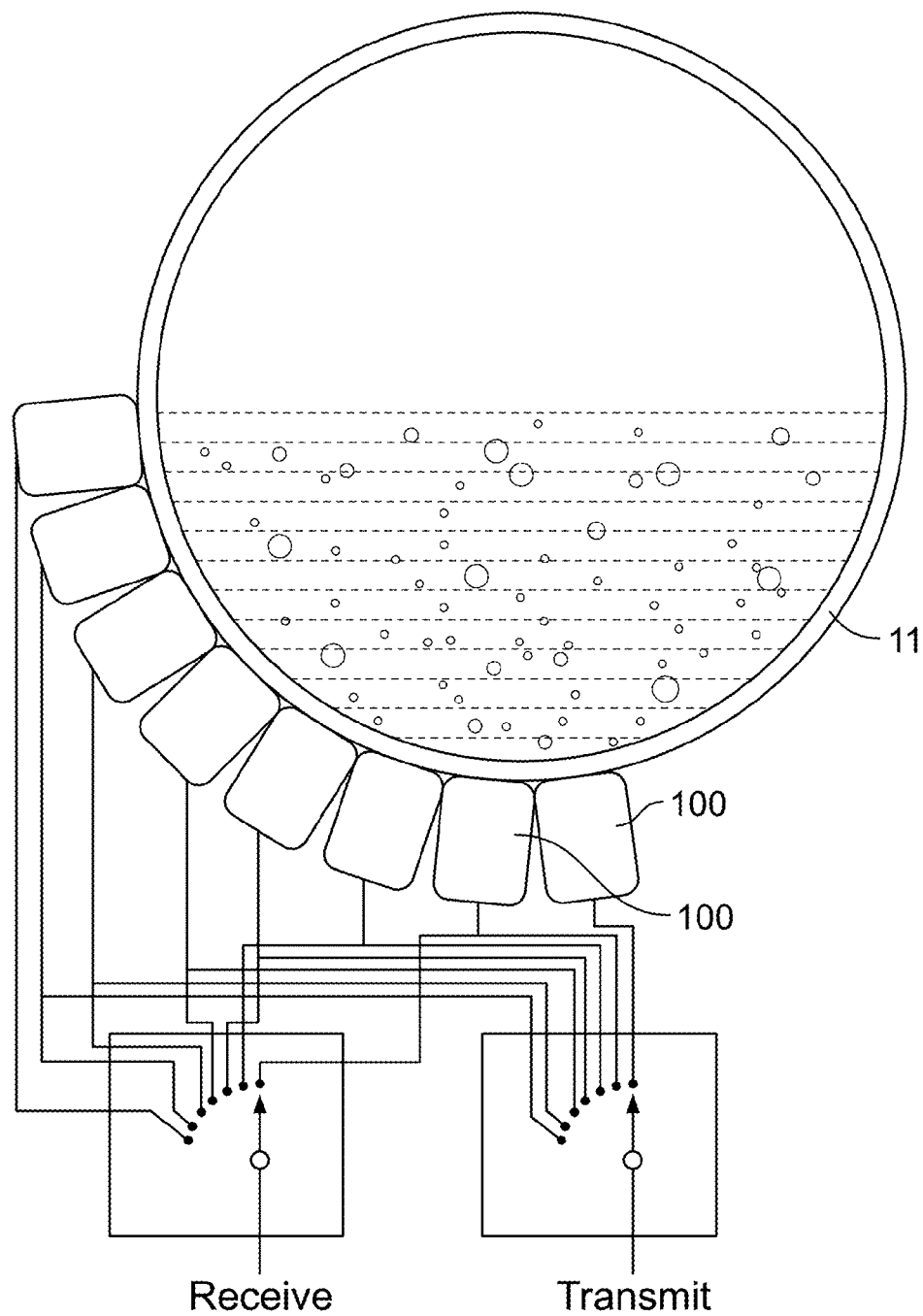
FIG. 7 is a schematic diagram illustrating the principle of using an array of Doppler transducers for level, profile and solid/gas concentration visualisation and/or analysis.

In one exemplary embodiment of the invention, an array of Doppler transducers is employed around the pipe. Referring to FIG. 7 of the drawings, the Doppler (Reflexor) transducers 100 are closely fitted around the circumference of the conduit or pipe 11. It can be seen that only the transducers having surfaces below the level of the liquid will be operational for a given level of fluid flow in a partially full pipe. Thus, by use of pulsed Doppler signals, it is possible to both determine the level of the flow by identifying the highest operational transducer, and also the flow rate by the change in frequency of the returned pulses. The flow profile can additionally be determined by timing the return time of the individual pulses from each transducer. By multiplexing the signals from the multiple Doppler sensors in an array around the pipe, means are provided that may enable the derivation of a detailed profile graphic of the flow, if required, which may be similar to an ultrasound technique, except that it is performed through a conduit wall. This detailed profile may, in turn, yield accurate viscosity and rheological profile measurements of the flowing fluid. The proposed technique may also reveal solid and gas entrained particle detail in the resultant graphic, such that accurate solids and gas calculations may be performed.

In practice, the multiplexing system allows a larger number of transducers to be operated from a single flow computer. Each transducer may be operated in both transmit and receive modes, thus increasing the achievable level of accuracy. More than one Doppler array could be used, thereby enabling the creation of a third dimensional 'ultrasound' graphic, and it will be appreciated that by spacing further arrays out of alignment with the first array, the available resolution of the ultrasound profile scan is increased.

Aspects of the invention introduce the "whole pipe spool as a flow meter" concept. It has been proven by the inventors that the mass flow is a constant for a given pipe diameter and angle for a given density and viscosity of liquid during standard conditions. Therefore, for a given temperature and pressure, provided that both vertical cross pipe density is known, and provided the liquid density is known, and provided the liquid viscosity is known, then the fluid height in the pipe can be predicted for a specific diameter and angle for a gravity fed flow rate. And so by measuring the vertical cross pipe density and the liquid density by means of a low horizontal density chord, the density and viscosity and therefore the liquid height for a given rate of flow is indicated. The viscosity may also be measured or calculated from a combination of the fluid temperature and/or sonic velocity which are known to infer viscosity for a given density of fluid. The four level measurements are then computed using density/viscosity algorithms which enable a flow rate from each technology to be derived. The calibration curves needed for these computations may be developed by installing the flow metering spool into a mass flow calibration rig, where controlled flows of different densities and viscosities are flowed sequentially through the spool to capture and generate calibration data. These flow runs can be repeated with the spool set at different angles to generate curve data for every variation of flow angle density and viscosity. This data is then used to derive said calibration curves. These curves can be uploaded into the flow computer for each application, and the calibration curves can be applied not just to spool pieces but to all pipes and conduits of the same dimensions.

These four flow measurements may be collated in harmony with the ultrasonic mass and volume flow rates which are adjusted for partially full pipe using the current master level method. Using a cross calibration software principle, such as that described briefly above, the derived measurements may be compared against the rolling average of the historic voted master method, and all measurement methods are cross calibrated to the master method making additional adjustments for temperature and pressure in the flow line. Meanwhile, the differences in the five flow measurement methods may be computed as a diagnostic which in turn can be used to reveal other characteristics of the mud flow, such as gas entrainment, foaming, and solids concentration.

Using voting mean deviation logic code, apparatus according to aspects of the invention can select the outlet flow measurement method that is best suited for the current flowing conditions, as described above. Using a code cross calibration facility, the five or more flow measurements can be continually tuned by invisibly small adjustments to the current master measurement in real time to cover for changes in process conditions and other factors such as cement residue after cementing operations. These small adjustments can also be used to amend the calibration curves for each measurement method in real time. Means may be provided that record and monitor self-diagnostics to ensure these small adjustments remain within a known tolerance along the whole calibration curve. A software-based application may be configured to choose to disregard sensors that it believes are giving erroneous readings such as would be definable as in-built redundancy.

Using the rolling averaging feature described briefly above, the embodiments of the invention can be provided with the facility to automatically cross calibrate to the mud inlet meter. The apparatus may be configured to check for stable flow conditions and, when these are met, the apparatus may be further configured to make controlled small adjustments over time to the mud outlet measurement taking into consideration the solids, entrained gas and other diagnostics as well as stable inlet and outlet flow conditions before allowing any adjustments. This may be performed in such a way to ensure that there is no significant deviation to ensure maximum accuracy and reporting of outlet mass flow along with totalised losses and gains to and from the formation. By means of the self-checking facility, any deviation from allowable tolerance from the default curves will register as a fault and could be arranged to force a return to the default backup calibration curves.

In this way, apparatus according to an exemplary embodiment provides a reliable outlet mud flow analyser, which continually self-adjusts all the while performing self-checking diagnostics. Any anomalies can be identified through their representative signatures, and may be flagged accordingly. Losses to, and gains from, formation may be totalised, and hole cleaning maintenance signatures and their effectiveness can be identified and recorded.

An embodiment of the present invention has been described above by way of example only and it will be appreciated by a person skilled in the art that modifications and variations can be made to the described embodiments without departing from the scope of the invention as claimed. For example, the apparatus described above has been developed as a fully clamp-on, non-intrusive solution, but there is flexibility for different applications where pipework permits. Some mud flow return lines have access via a paddle flow switch flange which allows additional non-intrusive level gauges to be fitted. In some cases it may be possible to install a spool piece which also allows additional level gauge options to be built in to the spool. In one exemplary embodiment, a spool option may be employed, and so in addition to the nuclear level gauging arrangement, the spool may employ additional radar and ultrasonic gauges for mud level. Alternatively, the flow line can be tapped to provide access points for the level gauges.

The invention claimed is:

1. A system for calculating a mass flow measurement in respect of a fluid flowing in a conduit having a cross-sectional area, the system comprising:
 a fluid flow loop comprising an input conduit and an output conduit, the output conduit comprising the conduit,
 a first flow measurement device mounted on the conduit, a first densitometer mounted on the conduit and oriented along a first axis relative to the conduit, a second densitometer oriented along a second axis relative to said conduit, the second axis being orthogonal to the first axis, a first processor element adapted to receive signals from the first flow measurement device and the first densitometer and configured to calculate a full pipe volumetric flow in respect of said fluid based on the signals received from the first flow measurement device, the first densitometer and said cross-sectional area of said conduit, and a second processor element adapted to receive full pipe volumetric flow data from said first processor element and signals from said second densitometer and configured to resolve a level of fluid flowing in the conduit using signals received from the second densitometer to obtain fluid level data and calculate a corrected mass flow of said fluid using said full pipe volumetric flow data and the fluid level data, wherein the fluid flow loop comprises a mud flow loop, and said fluid comprises mud, wherein said input conduit is located at an inlet suction line of said mud flow loop and said output conduit is located at a mud return line of said mud flow loop.

2. A system according to claim 1, wherein the second processor element is configured to compute fluid height in said conduit of said flowing fluid using cross-conduit fluid density data received from said first densitometer and said second densitometer.

3. A system according to claim 2, wherein at least the first or second densitometer comprises a non-intrusive densitometer clamped on to an outer wall of the conduit.

4. A system according to claim 1, further comprising a temperature measurement device mounted on the conduit, and wherein the first processor element is adapted to receive signals from the temperature measurement device and apply temperature compensation to a full pipe volumetric flow calculation.

5. A system according to claim 4, wherein the first processor element is configured to calculate viscosity data using signals from the temperature measurement device.

6. A system according to claim 1, comprising a calibration processor element configured to utilise calibration curve data derived using a calibration test loop including a plurality of test spools of different respective dimensions installed therein, such that repeated flow runs of different fluid densities, viscosities and flow rates can be performed with a spool or said conduit set at different respective angles to generate calibration data and calibration curve data for varying flow conditions, wherein said second processor element is configured to use said calibration curve data in real time to adjust said fluid level data for use in calculating said corrected mass flow.

7. A system according to claim 1, wherein said first flow measurement device comprises an array of two or more Doppler transducers, affixed to, or immediately adjacent to, an outer wall of said conduit, and configured to transmit and receive ultrasonic signals through said outer wall, and receive ultrasonic signals returned from within said conduit.

8. A system according to claim 7, wherein each of said plurality of transducers is located at a different height relative to fluid level in said conduit, such that fluid level in said conduit can be determined from determining the highest operational transducer, in use.

9. A system according to claim 7, wherein said returned ultrasonic signals, or data representative thereof, are multiplexed, and the apparatus further comprises a module for generating, from data representative of said returned signals, a graphic profile of said fluid flow in said conduit.

10. A system according to claim 1, comprising at least one oscillating component communicably coupled to the conduit and having a natural frequency of oscillation, the system further comprising an analysis module adapted to receive signals from the at least one oscillating component and configured to calculate, from one or more characteristics of the oscillation of said at least one oscillating component, density data in respect of said fluid in said conduit.

11. A system according to claim 10, wherein said analysis module is configured to compute the frequency peak of said at least one oscillating component using a spectrum analysis of the oscillation thereof, and thereby to calculate said density data; or to compute a change in the peak frequency of said oscillating component(s) as a function of the level of fluid in said conduit, and thereby determine said density data when said conduit is partially full.

12. A system according to claim 10, wherein an array of oscillating components, or data representative thereof, are multiplexed, and the system further comprises a module for generating, from data representative of said variance of oscillating component signals, topography of fluid flowing in said conduit.

13. A system according to claim 1, wherein said first densitometer is oriented in the same plane and orthogonal to the flow path of the fluid, and said second densitometer is oriented in a plane orthogonal to the plane of said flow path of said fluid.

14. A system according to claim 13, wherein said first and/or second densitometer comprises a nuclear densitometer non-intrusively/externally mounted relative to the conduit.

15. A system according to claim 1, wherein the first processor element and/or the second processor element is configured to compute from signals received from the first densitometer and the second densitometers a percentage level of fluid as a percentage of a diameter of said conduit; and to compute a partially empty pipe volumetric flow using said full pipe volumetric flow data and said percentage level of fluid.

16. A system according to claim 1, wherein said first flow measurement device comprises a Time of Flight measuring device and the second flow measurement device comprises a Doppler measuring device, the Time of Flight measuring device and the Doppler measuring device being mounted externally to the conduit.

17. A system according to claim 1, further comprising a radar fluid level sensor and/or an ultrasonic fluid level sensor mounted on the conduit.

18. A mass balance system for the fluid flow loop comprising the mass balance system and the system for calculating a mass flow measurement according to claim 1.

19. A mass balance system according to claim 18, further comprising a balance processor element adapted to automatically calibrate toward said inlet mass and volumetric flow measurement, wherein testing of different sensor diagnostic signals is used to indicate a period of stable output compared to input flow measurements, thereby permitting controlled incremental adjustments of said output measurement to the input measurement over time.

20. A mass balance system according to claim 18, comprising a comparison processor element adapted to receive input mass flow data in respect of said input conduit, and to receive corrected output mass flow data in respect of said output conduit, compare said input mass flow data and said corrected output mass flow data and generate data representative of the comparison.

21. A mass balance system according to claim 18, wherein the mud flow loop is on a drilling rig.

22. A mass balance system according to claim 21, comprising a high sensitivity atmospheric pressure measurement device mounted in said output conduit, and a pressure processor element adapted to receive signals from the atmospheric pressure measurement device to detect, in a gas void in said output conduit, a pressure wave that precedes an outflow kick from well in respect of which said drilling rig is being used.

23. A system according to claim 1, further comprising at least one gas detection device configured to analyse a gas void in said conduit and provide data representative thereof.

24. A system according to claim 1, comprising a sensitive atmospheric pressure device.

\* \* \* \* \*